United States Patent
Kares et al.

(10) Patent No.: US 10,190,596 B2
(45) Date of Patent: Jan. 29, 2019

(54) TWO-STAGE COMPRESSOR WITH ASYMMETRIC SECOND-STAGE INLET DUCT

(71) Applicant: Honeywell International Inc., Morris Plains, NJ (US)

(72) Inventors: Vaclav Kares, Strakonice (CZ); Vit Houst, Sestajovice (CZ); Ondrej Lednicky, Novy Jicin (CZ); Milan Nejedly, Brno (CZ); Michal Mokos, Ivancice (CZ); Zbynek Oslejsek, Brno (CZ); Daniel Turecek, Ostopovice (CZ)

(73) Assignee: Garrett Transportation I Inc., Torrance, CA (US)

( * ) Notice: Subject to any disclaimer, the term of this patent is extended or adjusted under 35 U.S.C. 154(b) by 118 days.

(21) Appl. No.: 15/342,131

(22) Filed: Nov. 3, 2016

(65) Prior Publication Data

US 2018/0119708 A1    May 3, 2018

(51) Int. Cl.
*F04D 29/42* (2006.01)
*F01D 9/02* (2006.01)
(Continued)

(52) U.S. Cl.
CPC ......... *F04D 29/4206* (2013.01); *F01D 9/026* (2013.01); *F01D 25/16* (2013.01);
(Continued)

(58) Field of Classification Search
CPC .... F04D 29/4206; F04D 25/04; F04D 29/285; F01D 9/026; F01D 25/16; F02B 37/00;
(Continued)

(56) References Cited

U.S. PATENT DOCUMENTS

| 2,407,987 A | 9/1946 | Landberg |
| 5,697,767 A | 12/1997 | Bissell et al. |

(Continued)

FOREIGN PATENT DOCUMENTS

| EP | 3133289 A1 | 2/2017 |
| GB | 127617 A | 4/1955 |

(Continued)

OTHER PUBLICATIONS

EPO Extended Search Report for EP Appl. No. 17199210.0/1004 dated Mar. 23, 2018.

*Primary Examiner* — Patrick Maines
(74) *Attorney, Agent, or Firm* — John C. James

(57) ABSTRACT

A multi-stage compressor for a turbocharger includes a compressor housing that defines an aperture for receiving a compressor wheel for successively compressing air in first and second stages. First- and second-stage inlets are fluidly connected to the aperture in opposite axial directions, and first- and second-stage volutes extend at least partially annularly therearound so that each volute is configured to receive gas flowing generally radially outward from the compressor wheel. First and second passages fluidly connect the first-stage volute to the second-stage inlet. The passages approach the second-stage inlet from opposite radially inward directions, and are asymmetric with respect to any pair of orthogonal axes having an origin lying on the turbocharger rotary axis as viewed on a transverse cross-section that is normal to the turbocharger axis.

6 Claims, 7 Drawing Sheets

(51) Int. Cl.
*F01D 25/16* (2006.01)
*F02B 37/00* (2006.01)
*F04D 25/04* (2006.01)
*F04D 29/28* (2006.01)
*F04D 17/12* (2006.01)
*F02C 6/12* (2006.01)

(52) U.S. Cl.
CPC ............... *F02B 37/00* (2013.01); *F02C 6/12* (2013.01); *F04D 17/12* (2013.01); *F04D 25/04* (2013.01); *F04D 29/285* (2013.01); *F04D 29/422* (2013.01); *F05D 2220/40* (2013.01); *F05D 2240/14* (2013.01); *F05D 2240/20* (2013.01); *F05D 2240/50* (2013.01)

(58) Field of Classification Search
CPC ............ F05D 2220/40; F05D 2240/14; F05D 2240/20; F05D 2240/50
See application file for complete search history.

(56) References Cited

U.S. PATENT DOCUMENTS

| | | | | |
|---|---|---|---|---|
| 6,062,028 | A * | 5/2000 | Arnold | F02C 6/12 417/407 |
| 7,014,418 | B1 * | 3/2006 | Arnold | F01D 1/22 415/100 |
| 9,856,886 | B2 * | 1/2018 | Kares | F04D 29/083 |
| 2004/0020203 | A1 * | 2/2004 | Arnold | F01D 5/048 60/602 |
| 2006/0198727 | A1 * | 9/2006 | Arnold | F01D 9/026 415/169.1 |
| 2010/0319343 | A1 * | 12/2010 | Arnold | F01D 5/048 60/605.1 |

FOREIGN PATENT DOCUMENTS

| | | | | |
|---|---|---|---|---|
| WO | 2006093878 A1 | 9/2006 | | |
| WO | WO 2015195343 A1 * | 12/2015 | ............ | F02B 37/013 |
| WO | WO 2016149728 A1 * | 9/2016 | ............ | F01D 25/12 |

* cited by examiner

TWO-STAGE COMPRESSOR WITH ASYMMETRIC SECOND-STAGE INLET DUCT

FIELD OF THE INVENTION

The present invention relates generally to a multi-stage compressor and, more particularly, to a two-stage centrifugal or radial-flow compressor with first- and second-stage volutes for successively delivering gas through the stages of the compressor and thereby sequentially compressing the gas in multiple stages.

BACKGROUND OF THE INVENTION

Compressors, such as those used in turbochargers, typically include a compressor wheel that is rotatably mounted in a housing and that defines blades extending radially outward in proximity to an inner surface of the housing. The housing defines an inlet for receiving air or other gas in an axial direction, and an annular diffuser extends circumferentially around the wheel to receive the air in a radial direction therefrom. A volute, disposed radially outward from the diffuser, is structured to receive the air from the diffuser. During operation, the air is compressed by the rotation of the blades of the compressor wheel and delivered radially outward through the diffuser to the volute. The compressor wheel is normally rotated at a high speed, such that the air is moved at a high velocity to the diffuser, which then slows the air and increases the static pressure of the air. In the volute, which provides a relatively large volume compared to the diffuser, the velocity of the air is further reduced and the static pressure of the air is also increased.

In the case of a compressor with multiple sequential stages, the air can be compressed to a first pressure in a first stage and then further compressed to a higher pressure in a second stage. For example, U.S. Pat. No. 6,062,028 to Arnold, et al., issued May 16, 2000 and assigned to the assignee of the present application, describes a "Low Speed High Pressure Ratio Turbocharger," which can have a two-stage compressor with back-to-back radial flow compressor wheels with integral air flow ducting. The rotational speed of the turbocharger can be reduced and/or the pressure ratio can be increased relative to single-stage devices.

While conventional two-stage compressors have been proven to be effective and to provide advantages over some single-stage compressors, there exists a continued need for an improved compressor that can be used to sequentially compress gas in multiple stages. In particular, the compressor should provide a smooth flow of gas from the outlet of the first stage to the inlet of the second stage, preferably while reducing the swirling of the gas exiting the first stage and/or while reducing the transfer of thermal energy between the gas exiting the second stage and the air flowing from the first stage to the second stage.

SUMMARY OF THE INVENTION

In accordance with one embodiment of the invention, the average swirl level into the second-stage inlet can be more-readily controlled by configuring the ducts or passages leading from the first-stage volute into the second-stage inlet in an asymmetric manner. In one embodiment described herein, a turbocharger comprises:

a center housing defining a bore extending therethrough in an axial direction, with bearings mounted in the bore and a rotatable shaft supported in the bearings so as to be rotatable about a turbocharger axis, the shaft having opposite ends, the center housing having axially opposite sides;

a compressor wheel mounted on one end of the shaft and a turbine wheel mounted on the other end of the shaft;

a compressor housing enclosing the compressor wheel and having opposite first and second sides, the second side mounted to one of the sides of the center housing;

a turbine housing mounted to the other side of the center housing enclosing the turbine wheel, the turbine housing defining an annular chamber surrounding the turbine wheel for receiving exhaust gas and directing the exhaust gas radially inwardly into the turbine wheel;

the compressor wheel having a first-stage impeller and a second-stage impeller arranged back-to-back, the compressor housing defining a first-stage inlet extending in the axial direction into the first side of the compressor housing for supplying air into the first-stage impeller, and defining a second-stage inlet extending opposite to the axial direction into the second side of the compressor housing for supplying air into the second-stage impeller, the compressor housing defining a generally annular first-stage volute surrounding the first-stage impeller for receiving air discharged therefrom, and a generally annular second-stage volute surrounding the second-stage impeller for receiving air discharged therefrom; and the compressor housing defining two separate passages each extending from the first-stage volute and then proceeding generally radially inwardly into the second-stage inlet, wherein the first-stage volute comprises two generally semi-annular segments that collectively substantially encircle the first-stage impeller, one of the passages being connected to one of the segments and the other of the passages being connected to the other of the segments. In accordance with the invention, the passages in a cross-sectional plane that is normal to the turbocharger axis have a configuration as viewed along the turbocharger axis that is asymmetric with respect to every pair of orthogonal axes having an origin lying on the turbocharger axis.

In one embodiment the two passages leading into the second-stage inlet are defined by walls that form two diametrically opposite tongues that act as a pinch point where the diameter D1° is at a minimum, wherein the diameter of the second-stage inlet is defined as D1, and wherein a diameter ratio D1/D1° is in the range of about 0.75 to 0.85.

In one embodiment an asymmetry angle Δ of the inlet structure is defined between a radial line L1 that extends between the tongues and a Y-axis that extends from the turbocharger rotary axis through an imaginary radial line that divides the second-stage volute and a discharge section joined to the second-stage volute for leading air out of the second-stage volute, wherein the asymmetry angle Δ is in the range of about 15° to about 30°.

In one embodiment, the first and second passages leading into the second-stage inlet are defined respectively by first and second walls, the first walls having left-hand and right-hand walls, the second walls having left-hand and right-hand walls, wherein the first and second left-hand walls form a left-hand tongue and the first and second right-hand walls form a right-hand tongue, the tongues acting as a pinch point where the diameter D1° is at a minimum. In accordance with the invention in this embodiment, at the tongues, a tangent to the right-hand wall of the first passage and a tangent to the left-hand wall of the second passage each forms an angle ALPHA with respect to a radial line L1 that extends between the tongues, and a tangent to the left-hand wall of the first passage and a tangent to the right-hand wall of the second passage each forms an angle BETA with respect to the line L1, and the angle ALPHA exceeds the angle BETA by at least 15°.

BRIEF DESCRIPTION OF THE SEVERAL VIEWS OF THE DRAWINGS

Figure 1:
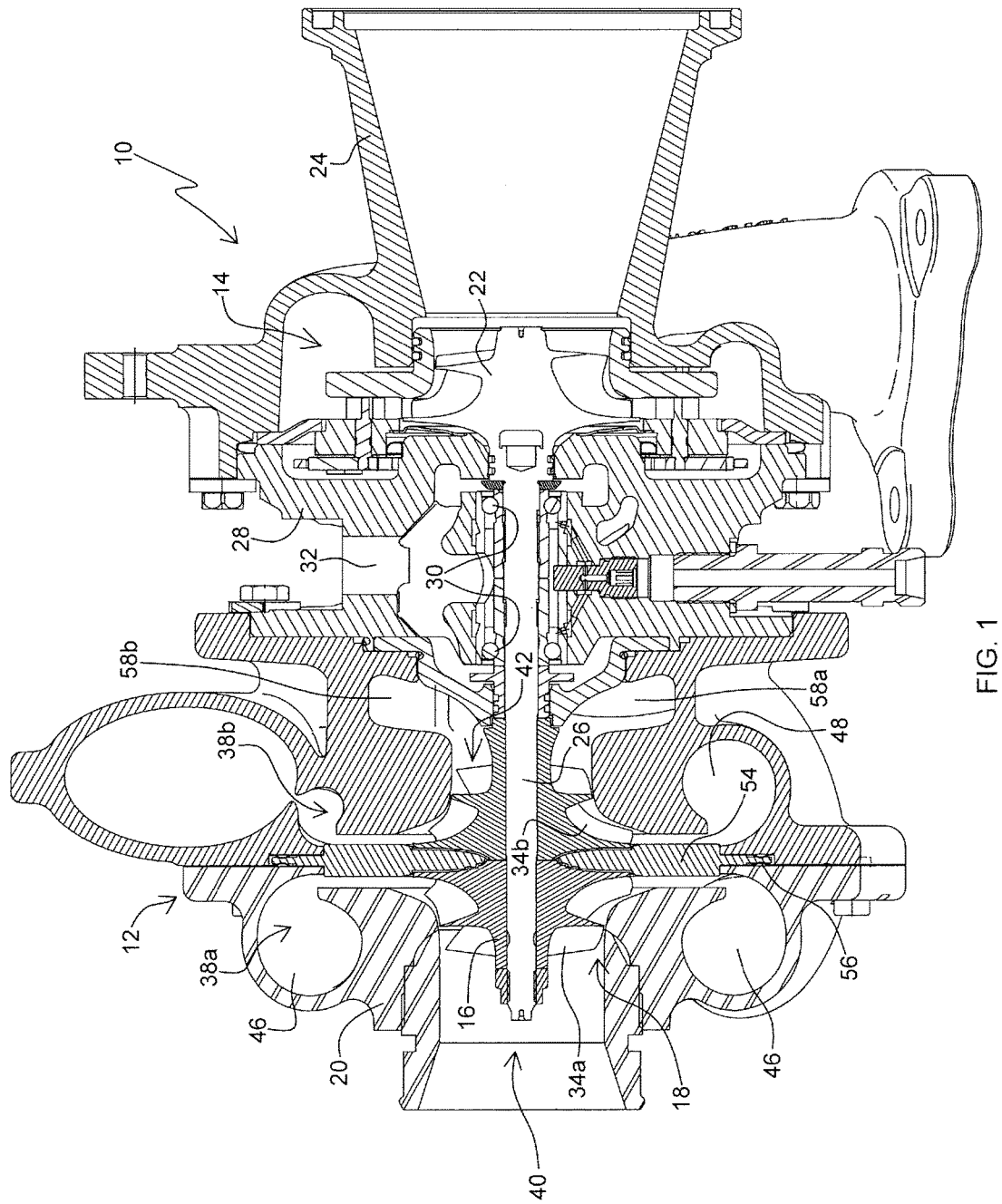
Figure 2:
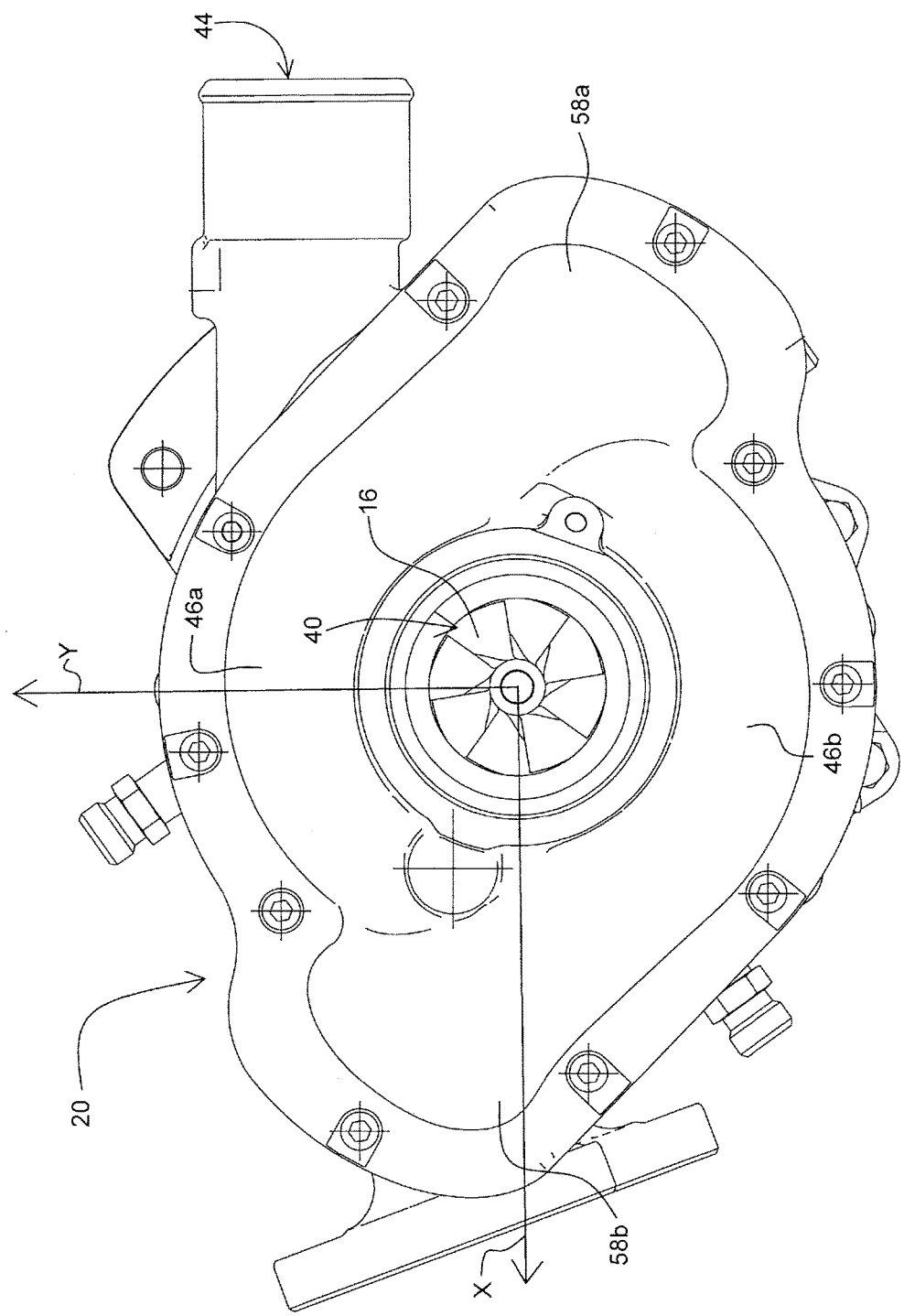
Figure 3:
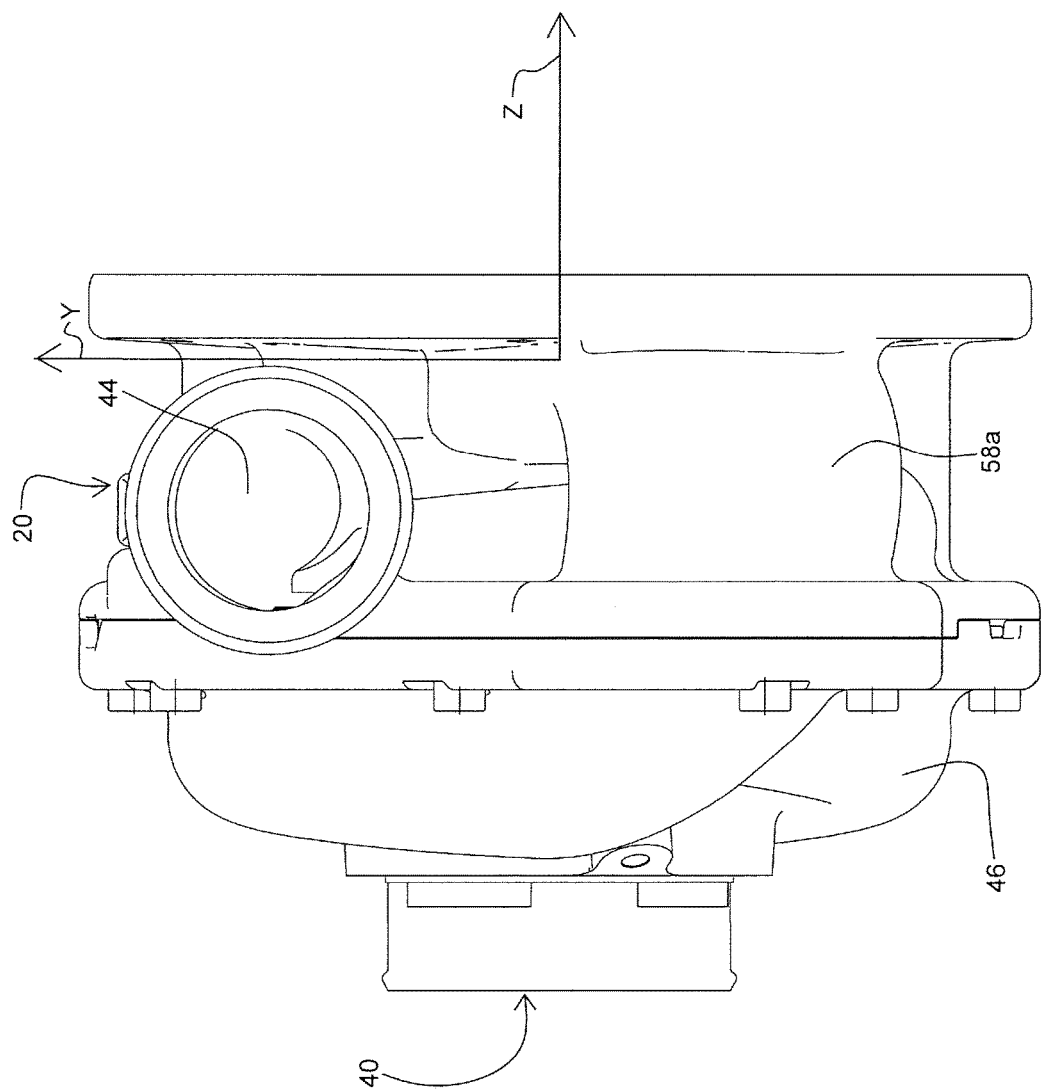
Figure 4:
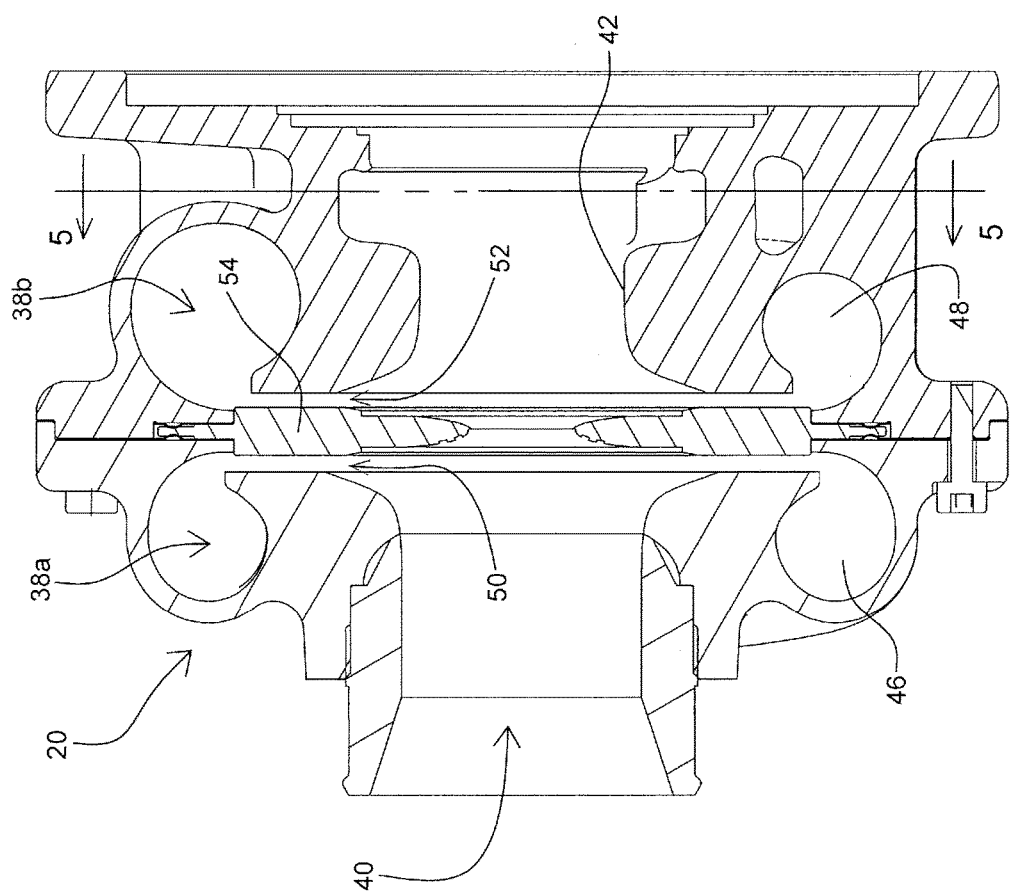
Figure 5:
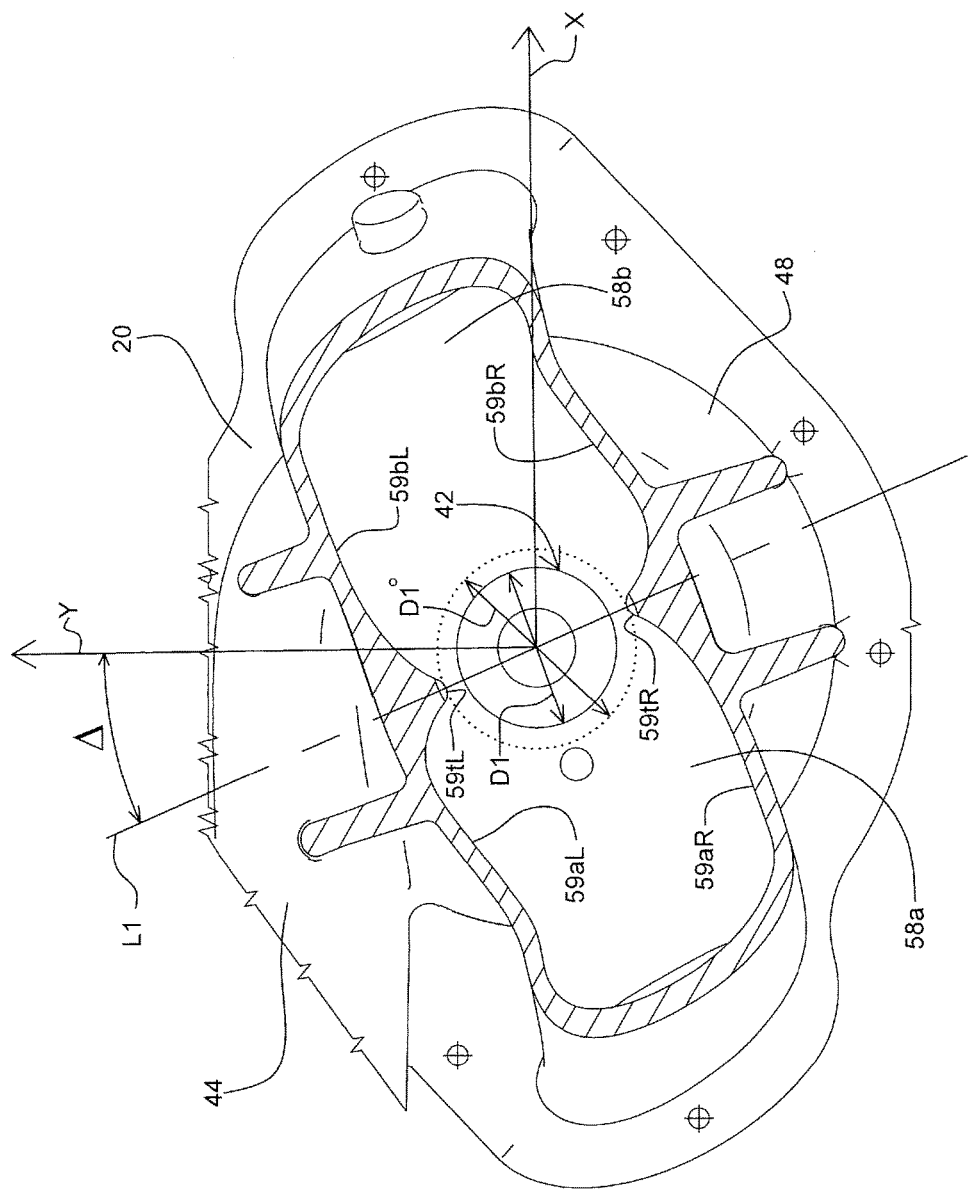
Figure 5A:
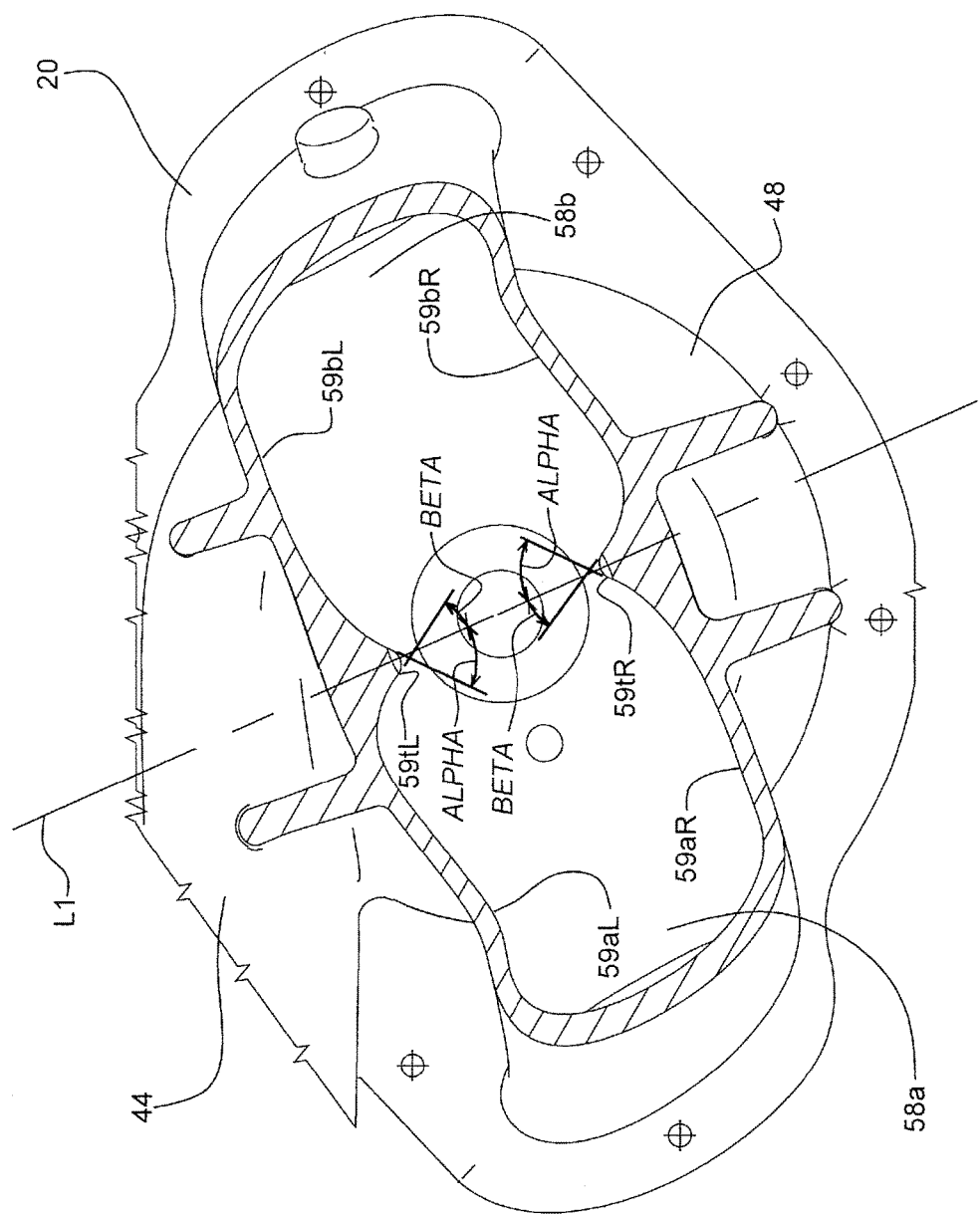
Figure 6:
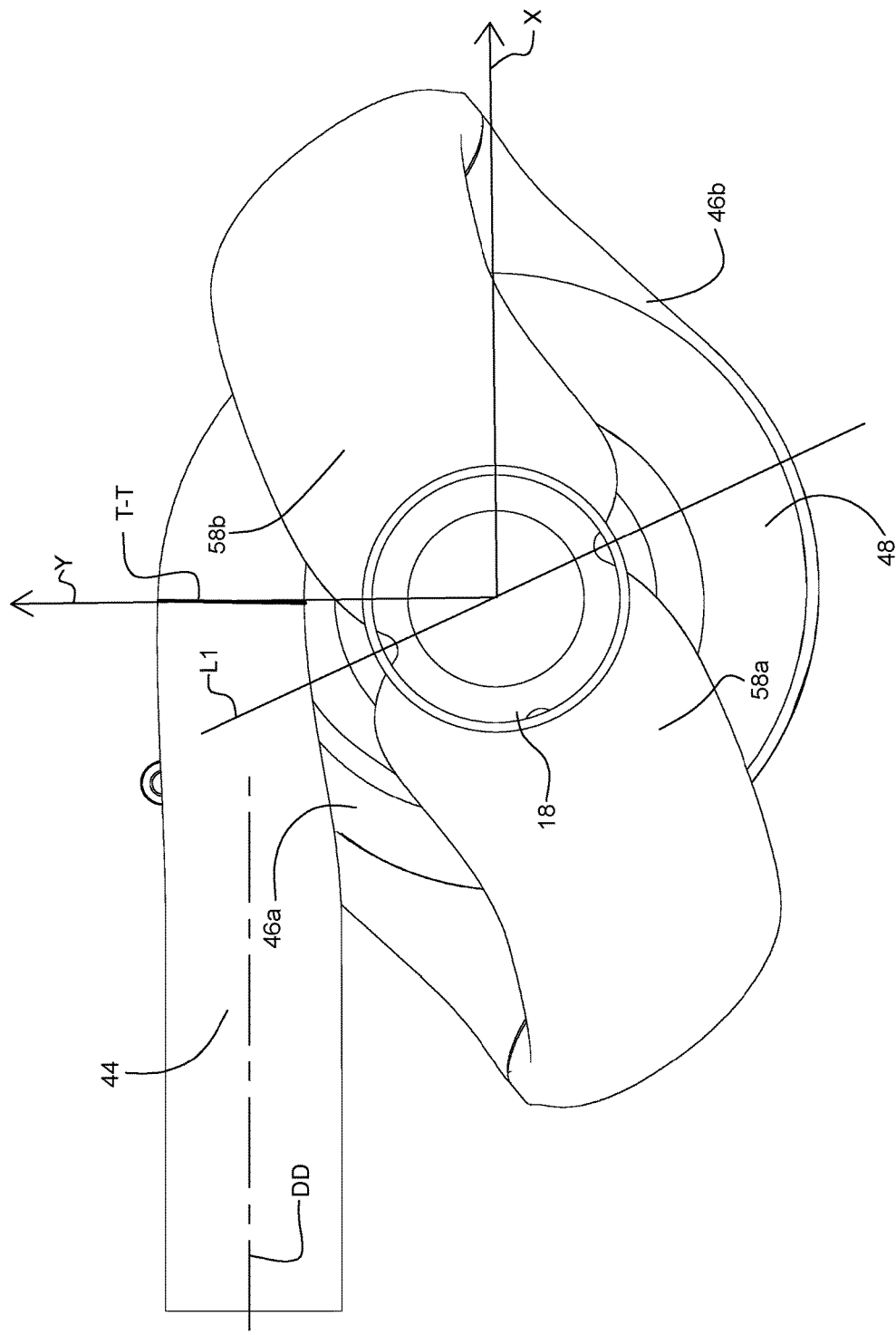

Having thus described the invention in general terms, reference will now be made to the accompanying drawings, which are not necessarily drawn to scale, and wherein:

FIG. 1 is an axial cross-sectional view illustrating a turbocharger having a multi-stage compressor according to one embodiment of the present invention;

FIG. 2 is an elevation view illustrating the compressor housing of the turbocharger of FIG. 1;

FIG. 3 is an elevation view illustrating the compressor housing of FIG. 2, as seen from the right side of FIG. 2;

FIG. 4 is an axial cross-sectional view illustrating the compressor housing of FIG. 2;

FIG. 5 is a cross-sectional view along line 5-5 in FIG. 4;

FIG. 5A is similar to FIG. 5 but includes different annotations for illustrating further features of the embodiment of the invention; and FIG. 6 is an elevation view illustrating a model of the flow path of the compressor housing of FIGS. 2-5.

DETAILED DESCRIPTION OF THE DRAWINGS

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring to FIG. 1, there is shown a turbocharger 10 having a multi-stage compressor 12 according to one embodiment of the present invention. The compressor 12 includes a compressor wheel 16 rotatably mounted in a cavity or aperture 18 defined by a body of a compressor housing 20. The turbocharger 10 includes a turbine 14 having a turbine wheel 22 that is disposed in a turbine housing 24. The compressor wheel 16 is connected to the turbine wheel 22 by a shaft 26 that extends in an axial direction therebetween. As shown in FIG. 1, the shaft 26 is rotatably mounted in a center housing 28 between the compressor 12 and the turbine 14 and supported by bearings 30 in the center housing 28. The center housing 28 can also define one or more passages 32 for receiving and circulating a flow of oil for lubrication and cooling.

The turbocharger 10 is configured to extract energy from the exhaust gas of an internal combustion engine (not shown). In particular, the turbine wheel 22 can be rotated by a flow of the exhaust gas through the turbine housing 24, thereby rotating the shaft 26 so that the compressor wheel 16 compresses air flowing through the compressor housing 20 and delivers the compressed air to an intake of the engine (not shown). While one embodiment of a turbocharger 10 is illustrated in FIG. 1, it is appreciated that other configurations of turbochargers can be used in accordance with the present invention. Further, in other embodiments of the present invention, the compressor 12 can be used to compress other gases, which can be used for other purposes, and in conjunction with devices other than turbochargers.

A plurality of blades 34a, 34b extend radially outward from the compressor wheel 16, and the blades 34a, 34b extend proximate to a contoured inner surface 36 of the housing 20 so that the compressor wheel 16 can be used to compress and deliver air or other gas through the housing 20. More particularly, the compressor 12 includes first and second stages 38a, 38b for successively compressing the air or other gas, typically to a first pressure in the first stage 38a and then to a higher, second pressure in the second stage 38b. In this way, the compressor 12 can generally achieve higher pressure than a conventional single-stage compressor and/or with lower rotational speeds of operation.

The compressor 12 can include multiple compressor wheels for successively compressing the gas, such as first and second wheels corresponding to first and second stages of compression, and the wheels can be configured in similar or dissimilar configurations along the same or different axes of rotation. Alternatively, as shown in FIG. 1, the single compressor wheel 16 can define different portions corresponding to the different stages of compression. That is, the compressor wheel 16 can define a first set of the blades 34a that is disposed in the first stage 38a of the compressor 12 and a second set of the blades 34b that is disposed in the second stage 38b of the compressor 12. The blades 34a, 34b extend radially outward and are directed in the axial direction of the compressor 12. In particular, the first set of blades 34a is directed in a first axial direction toward a first-stage inlet 40 of the compressor housing 20, and the second set of blades 34b is directed in an opposite, second axial direction toward a second-stage inlet 42 of the compressor housing 20.

As shown in FIG. 1, the first and second stages 38a, 38b of the compressor 12 define a "back-to-back" configuration, with the first-stage inlet 40 and second-stage inlet 42 being directed in opposite axial directions. That is, the compressor wheel 16 is configured to receive gas into the first-stage inlet 40 in a first direction and into the second-stage inlet 42 in a generally opposing, collinear direction. Gas is circulated from the first stage 38a of the compressor 12 to the second stage 38b as described further below. Thereafter, the gas can be discharged from the second stage 38b along a discharge direction DD (FIG. 6) via a second-stage outlet 44, which can extend in a generally tangential direction toward an inlet of an internal combustion engine or the like.

As shown, e.g., in FIGS. 1 and 4, the compressor housing 20 defines first- and second-stage volutes 46, 48 corresponding to the first- and second-stages 38a, 38b of the compressor 12. Each of the volutes 46, 48 is configured to receive the gas from the respective set of blades 34a, 34b of the compressor wheel 16 in a generally radially outward direction via a diffuser 50, 52. That is, a first-stage diffuser 50 defined by the housing 20 extends circumferentially around the first set of blades 34a and fluidly connects the aperture 18 to the first-stage volute 46. Similarly, a second-stage diffuser 52 defined by the housing 20 extends circumferentially around the second set of blades 34b and fluidly connects the aperture 18 to the second-stage volute 48. Thus, each stage 38a, 38b of the compressor 12 is configured to receive gas in a generally axial direction and deliver the gas in a generally radial direction outward through the respective diffuser 50, 52 and into the respective volute 46, 48.

The first and second diffusers 50, 52 are separated by a baffle 54 or seal plate. The baffle 54 is configured to remain stationary relative to the housing 20 such that the compressor wheel 16 rotates adjacent to the baffle 54, though in other cases the baffle 54 can rotate with the wheel 16. In any case, seals 56 can be provided between the baffle 54 and the wheel 16 and/or the housing 20 to prevent gas from flowing directly between the diffusers 50, 52 or the volutes 46, 48.

Referring now to the configuration of the volutes 46, 48, it is shown in FIG. 2 that the first-stage volute 46 includes first and second segments or portions 46*a*, 46*b*. Each portion 46*a*, 46*b* extends about 180 degrees around the compressor wheel 16 and is fluidly connected to the second-stage inlet 42 by a respective one of two passages 58*a*, 58*b* or conduits formed by the compressor housing 20. Each passage 58*a*, 58*b* extends axially between the first-stage volute 46 and the second-stage inlet 42 and passes radially outward of the second-stage volute 48.

The configuration of the passages 58*a*, 58*b* is further illustrated in FIGS. 5 and 6. FIG. 5 is a cross-sectional view on line 5-5 of FIG. 4. FIG. 6 illustrates, in solid form for purposes of illustrative clarity, the voids defined by a portion of the flow path through the compressor and, in particular, the voids defined by the volutes 46, 48 and the passages 58*a*, 58*b*. In this regard, it is noted that the terms "volute," "passage," and "diffuser" are used herein to refer to the corresponding structures as well as the voids or spaces defined thereby. As illustrated, the second-stage volute 48 can extend substantially continuously and annularly around the aperture 18 of the housing 20. Typically, the second-stage volute 48 defines an increasing cross-sectional size in the direction of the flow of the gas therethrough. The outlet 44 from the second-stage volute 48 can extend in a generally tangential direction outward from the second-stage volute 48. Similarly, the first-stage volute 46 can extend continuously in an annular configuration, with each portion 46*a*, 46*b* of the first-stage volute 46 extending approximately 180 degrees. Each portion 46*a*, 46*b* of the first-stage volute 46 can also have a cross-sectional size that increases in the direction of the flow of the gas, i.e., toward a respective one of the passages 58*a*, 58*b* extending therefrom to the second-stage inlet 42. Thus, the speed of the gas can be reduced in the volutes 46, 48.

As noted above, the second-stage volute 48 is typically positioned axially between the first-stage volute 46 and the second-stage inlet 42 and each passage 58*a*, 58*b* extends axially past the second-stage volute 48 to connect the first-stage volute 46 to the second-stage inlet 42. In this regard, each passage 58*a*, 58*b* can extend from the first-stage volute 46 to a position radially outward of the second-stage volute 48 and therefrom to the second-stage inlet 42. Typically, the passages 58*a*, 58*b* extend in a substantially tangential direction from the respective portions of the first-stage volute 46, but the passages 58*a*, 58*b* can extend in a substantially radial direction adjacent the second-stage inlet 42 to reduce the swirl of the gas in the second-stage inlet 42. Further, the passages 58*a*, 58*b* can transition from a generally tubular configuration at the first-stage volute 46 to a flattened configuration at the second-stage inlet 42, i.e., a configuration having a cross-sectional size with a first dimension in a transverse direction of the compressor housing 20 that is greater than the width of the first-stage volute 46 and/or greater than a second, perpendicular dimension of each passage 58*a*, 58*b* in the axial direction.

In operation according to one embodiment of the present invention, air is successively compressed in the first and second stages 38*a*, 38*b* of the compressor 12. In particular, the air is received through the first-stage inlet 40 to the first set of blades 34*a* of the compressor wheel 16, i.e., the first stage of the wheel 16. As the compressor wheel 16 rotates, the air is compressed to a first pressure and delivered to the first-stage volute 46. The air circulates from the first-stage volute 46 through the first and second passages 58*a*, 58*b* and therefrom through the second-stage inlet 42 in a generally axial direction to the second set of blades 34*b* of the wheel 16, i.e., the second stage of the wheel 16. In particular, the air circulates through each passage 58*a*, 58*b* in a path that extends radially outward beyond the second-stage volute 48 and from the first-stage volute 46 to a position axially opposite the second-stage volute 48 from the first-stage volute 46. The air can enter the second stage 38*b* in an axial direction that is opposite the direction of the air entering the first stage 38*a*. The air is then compressed again and delivered at a second pressure to the second-stage volute 48.

In accordance with the invention, the first and second passages 58*a* and 58*b* are configured to provide optimum flow conditions into the second-stage inlet 42. In particular, as illustrated in FIGS. 5 and 6, the first and second passages 58*a*, 58*b* can spread the flow about the circumference of the second-stage inlet 42 so that the air enters the second-stage inlet 42 with substantially uniform pressure and velocity. The first and second passages 58*a*, 58*b* are configured to be asymmetric so as to provide the desired flow into the second-stage inlet 42. With particular reference to FIG. 5, the first passage 58*a* is defined by a left wall 59*a*L and an opposite right wall 59*a*R. The second passage 58*b* is defined by a left wall 59*b*L and a right wall 59*b*R. In accordance with the invention, on a transverse cross-section (i.e., on a plane normal to the rotational axis of the turbocharger, as exemplified by the cross-section in FIG. 5) through the first and second passages 58*a* and 58*b*, there is no set of orthogonal axes having an origin lying on the turbocharger axis about which the first and second passages 58*a* and 58*b* are symmetric. For any such set of orthogonal axes, each of the first and second passages 58*a* and 58*b* is asymmetric with respect to each of those axes.

FIG. 5 includes additional annotations for explaining the asymmetry angle and diameter ratio that characterize the embodiment of the invention. It can be seen in FIG. 5 that the lefthand walls 59*a*L and 59*b*L join each other at their radially inner ends and form a tongue 59*t*L that acts as a pinch point where the diameter is at a minimum. The righthand walls 59*a*R and 59*b*R similarly form a tongue 59*t*R diametrically opposite from the left tongue 59*t*L. The diameter defined between the tongues 59*t*L and 59*t*R is denoted as D1°. The diameter of the second compressor inlet 42 is denoted as D1. In accordance with the embodiment of the invention, the diameter ratio D1/D1° is in the range of about 0.75 to 0.85.

FIG. 5 also illustrates an asymmetry angle A of the inlet structure. The asymmetry angle is defined between the line L1 that extends between the tongues 59tL and 59tR, and the Y-axis that is best understood with reference to FIGS. 2 and 3. A mutually orthogonal XYZ Cartesian coordinate system defined by axes X, Y, and Z is drawn on FIGS. 2 and 3. The Y-axis is defined as an axis that extends from the turbocharger rotary axis through the T-T section of the second compressor stage. As known in the art, the T-T section (see FIG. 6) is the imaginary radial line that divides the volute (in this case, the second volute 48) and the discharge section or pipe 44. The X-axis is orthogonal to the Y-axis and is aligned along the direction opposite to the discharge direction DD (FIG. 6) that air exits the second compressor stage via the discharge pipe 44. The Z-axis is mutually orthogonal to the X- and Y-axes and follows a right-hand screw convention such that the compressor wheel rotates in a direction to rotate the X-axis into the Y-axis, the Z-axis then pointing in the "thumb" direction. The asymmetry angle $\Delta$ is defined between the line L1 extending between the tongues and the Y-axis as shown in FIG. 5. In accordance with the embodiment of the invention, the asymmetry angle $\Delta$ is in the range of about 15° to about 30°.

With reference to FIG. 5A, a further aspect of the passage asymmetry is illustrated. A tangent to the right-hand wall 59aR of the first passage 58a, where the right-hand wall 59aR meets the right-hand tongue 59tR, forms an angle ALPHA with respect to the line L1. A tangent to the left-hand wall 59bL of the second passage 58b forms that same angle ALPHA with respect to the line L1. On the other hand, a tangent to the left-hand wall 59aL of the first passage, and a tangent to the right-hand wall 59bR of the second passage 58b, form an angle BETA with respect to the line L1. In accordance with the embodiment of the invention, ALPHA minus BETA is between 15° and 30°. As one example, ALPHA can be about 45° and BETA can be about 30° (therefore BETA/ALPHA=0.66). As another example, ALPHA can be about 60° and BETA can be about 40° (therefore BETA/ALPHA=0.66) This difference in angular orientation of the right-hand and left-hand walls at the tongues is referred to herein as the "skew angle" of the passages. In prior art arrangements of two-stage serial compressors, such as in U.S. Pat. No. 7,014,418, commonly owned with the present application and the entire disclosure of which is hereby incorporated herein by reference, the skew angle is zero. By employing a non-zero skew angle, and particularly by making the skew angle about 15° to 30°, the swirl angle into the second-stage impeller can be controlled to be optimum, especially at or near surge conditions and at or near choke conditions. For example, the skew angle can be chosen so that the swirl angle at surge is between 0° and 25°, with an average of 12°, and the swirl angle at choke is between −5° and 15°, with an average of 5°. These swirl levels of course are only an example for illustrative purposes; the invention is not limited to any particular swirl values.

The asymmetric configuration of the passages 58a and 58b provides an extra degree of freedom in the design of the passages so that the average swirl at the second-stage inlet 42 can be controlled to the desired level. The asymmetric design is especially useful for controlling the average swirl at choke conditions, which is important for maintaining a wide range of compressor performance, from surge to choke.

Specific terms used herein are employed for explanatory purposes rather than purposes of limitation. Accordingly, the inventions are not to be limited to the specific embodiments disclosed, and modifications and other embodiments are intended to be included within the scope of the appended claims. Other variations that do not depart from the described inventive concept are also included within the scope of the appended claims.

What is claimed is:

1. A turbocharger, comprising:
a center housing defining a bore extending therethrough in an axial direction, with bearings mounted in the bore and a rotatable shaft supported in the bearings so as to be rotatable about a turbocharger axis, the shaft having opposite ends, the center housing having axially opposite sides;
a compressor wheel mounted on one end of the shaft and a turbine wheel mounted on the other end of the shaft;
a compressor housing enclosing the compressor wheel and having opposite first and second sides, the second side mounted to one of the sides of the center housing;
a turbine housing mounted to the other side of the center housing enclosing the turbine wheel, the turbine housing defining an annular chamber surrounding the turbine wheel for receiving exhaust gas and directing the exhaust gas radially inwardly into the turbine wheel;
the compressor wheel having a first-stage impeller and a second-stage impeller arranged back-to-back, the compressor housing defining a first-stage inlet extending in the axial direction into the first side of the compressor housing for supplying air into the first-stage impeller, and defining a second-stage inlet extending opposite to the axial direction into the second side of the compressor housing for supplying air into the second-stage impeller, the compressor housing defining a generally annular first-stage volute surrounding the first-stage impeller for receiving air discharged therefrom, and a generally annular second-stage volute surrounding the second-stage impeller for receiving air discharged therefrom, the compressor housing further defining a second-stage outlet conduit through which air is discharged from the second-stage volute along a discharge direction;
wherein an XYZ coordinate system for the compressor is defined having a Y-axis that extends from the turbocharger axis through and along an imaginary radial line T-T that divides the second-stage volute from the second-stage outlet conduit, having an X-axis that is orthogonal to the Y-axis and is aligned along a direction opposite to the discharge direction along which air exits the second-stage volute, and having a Z-axis that is mutually orthogonal to the X- and Y-axes and follows a right-hand screw convention;
the compressor housing defining two separate first and second passages each extending from the first-stage volute and then proceeding generally radially inwardly into the second-stage inlet, wherein the first-stage volute comprises two generally semi-annular segments that collectively substantially encircle the first-stage impeller, the first passage being connected to one of the segments and the second passage being connected to the other of the segments, wherein the first and second passages in a cross-sectional plane that is normal to the Z-axis have a configuration as viewed along the Z-axis that is asymmetric with respect to the X-axis and is asymmetric with respect to the Y-axis; and
wherein the first and second passages leading into the second-stage inlet are defined respectively by first and second walls that form two diametrically opposite left-hand and right-hand tongues that act as a pinch point where the diameter D1° is at a minimum, and wherein a radial line L1 that lies in said cross-sectional plane and that extends between the tongues is angularly offset from the Y-axis.

2. The turbocharger of claim 1, wherein each of the two segments of the first-stage volute has a cross-sectional size that increases in a direction toward a respective one of the passages extending generally tangentially therefrom.

3. The turbocharger of claim 1, wherein a cross-sectional size of the second-stage volute increases in a direction toward the outlet conduit.

4. The turbocharger of claim 1, wherein the diameter of the second-stage inlet is defined as D1, and wherein a diameter ratio D1/D1° is in the range of 0.75 to 0.85.

5. The turbocharger of claim 4, wherein the radial line L1 that extends between the tongues is angularly offset from the Y-axis by an asymmetry angle Δ that is in the range of 15° to 30°.

6. The turbocharger of claim 1, the first walls having left-hand and right-hand walls, the second walls having left-hand and right-hand walls, wherein the first and second left-hand walls form the left-hand tongue and the first and second right-hand walls form the right-hand tongue, wherein, at the tongues, a tangent to the right-hand wall of the first passage and a tangent to the left-hand wall of the second passage each forms an angle ALPHA with respect to the radial line L1, and a tangent to the left-hand wall of the first passage and a tangent to the right-hand wall of the second passage each forms an angle BETA with respect to the radial line L1, and the angle ALPHA exceeds the angle BETA by at least 15°.

* * * * *